US006892074B2

(12) United States Patent
Tarkiainen et al.

(10) Patent No.: US 6,892,074 B2
(45) Date of Patent: May 10, 2005

(54) SELECTIVE MESSAGE SERVICE TO PRIMARY AND SECONDARY MOBILE STATIONS

(75) Inventors: Mika Tarkiainen, Oulu (FI); Stephen Williams, Tampere (FI); Ari Riekki, Oulu (FI)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/138,218

(22) Filed: Aug. 21, 1998

(65) Prior Publication Data

US 2001/0041560 A1 Nov. 15, 2001

(30) Foreign Application Priority Data

Aug. 28, 1997 (FI) .................................................. 973544

(51) Int. Cl.⁷ .................................................. H04Q 7/20
(52) U.S. Cl. ..................... 455/466; 455/412.1; 455/445
(58) Field of Search .............................. 455/466, 412.1, 455/445, 433, 432.1, 414, 417, 556, 458; 379/221.01, 88.18, 88.26, 466

(56) References Cited

U.S. PATENT DOCUMENTS

| | | | | |
|---|---|---|---|---|
| 5,020,090 A | * | 5/1991 | Morris ..................... 455/556.1 |
| 5,189,632 A | | 2/1993 | Paajanen et al. ........ 364/705.05 |
| 5,311,570 A | * | 5/1994 | Grimes et al. .............. 455/417 |
| 5,351,235 A | | 9/1994 | Lahtinen ..................... 370/259 |
| 5,353,331 A | * | 10/1994 | Emery et al. ............... 455/433 |
| 5,357,558 A | * | 10/1994 | Yoshikawa .................. 455/463 |
| 5,416,473 A | | 5/1995 | Dulaney, III et al. ... 340/825.44 |
| 5,511,111 A | * | 4/1996 | Sertcioglu et al. .......... 379/142 |
| 5,541,976 A | * | 7/1996 | Ghisler ..................... 455/426.1 |
| 5,546,444 A | * | 8/1996 | Roach, Jr. et al. ............ 379/58 |
| 5,604,921 A | | 2/1997 | Alanara ....................... 455/45 |
| 5,678,196 A | * | 10/1997 | Doyle ......................... 455/466 |
| 5,692,032 A | | 11/1997 | Seppanen et al. ............. 379/59 |
| 5,742,905 A | * | 4/1998 | Pepe et al. ................... 455/461 |
| 5,745,850 A | * | 4/1998 | Aldermeshian et al. ..... 455/417 |
| 5,790,875 A | | 8/1998 | Andersin et al. ...... 395/750.03 |
| 5,794,142 A | | 8/1998 | Vanttila et al. .............. 455/419 |
| 5,797,089 A | * | 8/1998 | Nguyen ....................... 455/403 |
| 5,802,465 A | | 9/1998 | Hamalainen et al. ........ 455/403 |
| 5,841,854 A | * | 11/1998 | Schumacher et al. .. 379/265.11 |
| 5,884,159 A | * | 3/1999 | Thro et al. ................... 455/417 |
| 5,905,777 A | * | 5/1999 | Foladare et al. ......... 379/90.01 |
| 5,930,700 A | * | 7/1999 | Pepper et al. ............... 455/414 |
| 5,943,620 A | * | 8/1999 | Boltz et al. ................ 455/445 |
| 5,950,128 A | * | 9/1999 | Ghisler .................... 455/426.1 |
| 5,983,073 A | * | 11/1999 | Ditzik ......................... 455/557 |
| 6,134,433 A | * | 10/2000 | Joong et al. ................ 455/417 |
| 6,148,193 A | * | 11/2000 | Miska et al. ................ 455/410 |
| 6,161,007 A | * | 12/2000 | McCutcheon et al. ...... 455/412 |

FOREIGN PATENT DOCUMENTS

| | | |
|---|---|---|
| WO | WO 94/17644 | 8/1994 |
| WO | WO 98/26626 | 6/1998 |

OTHER PUBLICATIONS

TSK 19: "Matkaviestinsanasto Mobilteleordlista—Vocabulary of Mobile Communications", Tekniikan Sanastokeskus, (ISBN 951–95567–9–6), Helsinki 1993.

* cited by examiner

Primary Examiner—Tilahun Gesesse
(74) Attorney, Agent, or Firm—Perman & Green, LLP

(57) ABSTRACT

The invention relates to a method for the transmission of messages by using a message service to a recipient who uses at least a primary mobile station (3), in which there is at least the possibility to receive calls and messages, and at least one secondary mobile station (4, 4'), in which there is at least the possibility to receive messages. The messages addressed to the primary mobile station (3) can be directed to any of the secondary mobile stations (4, 4') of the recipient, irrespective of calls.

36 Claims, 5 Drawing Sheets

SELECTIVE MESSAGE SERVICE TO PRIMARY AND SECONDARY MOBILE STATIONS

BACKGROUND OF THE INVENTION

1. Field of the Invention

The present invention relates to a method for the as presented in the introductory part of the appended claim 1. The present invention relates also to a system as presented in the introductory part of the appended claim 6.

2. Description of the Prior Art

Message service refers in this context e.g. to short message service (SMS) as well as to paging. In a corresponding manner, a system for the transmission of messages refers to a system for applying a message service, preferably a mobile communication system. In the publication TSK 19: "Matkaviestinsanasto—Vocabulary of Mobile Communications" by Tekniikan Sanastokeskus r.y. (ISBN 951-95567-9-6), a mobile communication system is defined as a data communication system formed by a mobile communication network and mobile stations. Mobile communication systems include a cellular system, a paging system as well as a mobile telephone system. A cellular system, such as a GSM system, is a mobile communication system using a cellular network. A paging system is a simplex mobile communication system intended for paging. A mobile telephone system is a duplex mobile communication system intended primarily for the transmission of speech. A mobile station refers in this context to a mobile station and to a paging receiver applicable for the reception of messages transmitted by a message service.

The user has for example two mobile stations which in this description, for the sake of clarity, are called a primary mobile station and a secondary mobile station. The primary mobile station refers to the mobile station primarily used by the user. Accordingly, the secondary mobile station refers to the mobile station used less frequently by the user. These mobile stations can be substantially identical with respect to the properties, or the primary mobile station has usually more extensive properties than the secondary mobile station. The primary mobile station has for example the telefax functionality, the electronic mail functionality and a calendar function. The secondary mobile station, instead, may be lighter and more compact, and it may thus be more convenient to carry along.

The transmission of a message in a message transmission system is typically conducted in a way that the sender of the message writes a text message e.g. with a mobile station or with a computer in communication with a telecommunication network, and defines the message a receiver address. The receiver address is e.g. a code identifying the mobile station of the recipient of the message, such as a telephone number. The message transmission system comprises means for receiving the message to be transmitted from the sender and means for retrieving the address of the recipient of the message and for sending the message to the mobile station of the recipient.

A message service centre is e.g. in the GSM system advantageously a short message service centre (SM-SC), a paging network controller (PNC) or a wireless messaging switch (WMS).

Also, the transmitted message can be intended to be received by several recipients, wherein a so-called group transmission is involved. Thus the transmission includes information about the group of recipients, wherein the message transmission system has the identification data of the mobile stations belonging to the group and the message is transmitted to all the mobile stations of this group. A group transmission can also be sent in a way that the identification data of the mobile stations belonging to the group is stored in the mobile station of the sender, wherein the mobile station of the sender generates the message to be transmitted to each mobile station in the group and transmits each message separately. This alternative does not require that the message transmission system has group transmission handling properties and group data storage capacity.

One known message transmission system is paging, wherein the message to be transmitted can be given e.g. by means of a telecommunication terminal connected with a landline or wireless telecommunication network. The message is transmitted to a paging network controller equipped with means (a modulator an a radio transmitter) for transmitting the message via the radio channel to the paging receiver. The paging receiver has a radio receiver and a demodulator for demodulating the message. Furthermore, the paging device comprises means for presenting the message to the recipient. The message can be given for example as a text message or a sound message.

Another message transmission system is the short message service of the GSM mobile communication network. Thus the message to be transmitted can be formed as a short message e.g. with a mobile station or a data processor in communication with a telecommunication network. The short message is provided with the identification data of the mobile station of the recipient, such as a telephone number. On the basis of the identification data, the short message is transmitted to the mobile station of the recipient. The short message service centre SM-SC controls the transmission of short messages in the GSM mobile communication network. The mobile station of the recipient receives the short message and informs the recipient of the reception of the message. Thus the recipient can e.g. by means of the menu functions read the received short message. The transmitting and receiving mobile stations can also belong to mobile communication networks provided by different teleoperators, and they can also be mobile stations of different mobile communication systems, if the properties for transmission of short messages are arranged between these mobile communication systems. The receiving mobile station can also be a paging device. This is prior art, so that its more detailed presentation will be rendered unnecessary in this context.

Systems have been developed for reminding the user at a given time of the beginning of an event. In this description, events of this kind are called calendar events. These calendar events can include a meeting, a special day, an appointment, a trip, or an exhibition. The user has a calendar application at his or her availability, for example a computer calendar program, or a calendar application of a personal digital assistant (PDA) or a mobile station. The calendar application gives also a possibility to set an alarm of the beginning of a certain event. This alarm can be set at the time of beginning of the event or possibly also some time before the beginning of this event, so that the user will have some time to be prepared for the event. This is a very useful function particularly for reminding of the beginning of meetings. The alarm can be a sound signal or it can also be a text message that is displayed on the display device of the mobile station.

U.S. Pat. No. 5,416,473 discloses one such calendar-controlled selective message system and a method for its use. The system comprises an electronic data processor with means for transmitting a message to a paging device, means for writing the message, means for selecting the address of the paging device, and means for transmitting the message at a predetermined moment of time to at least one selected paging receiver. The data processor used can be for example a computer with a modem for connecting the computer into data communication with a telecommunication network, such as a landline telecommunication network. The memory means of the data processor contains a stored list on the identification data of paging devices and a real-time calendar in which the user can enter the events in advance. The software of the data processor contains an application program which monitors the alarm times of events entered in the calendar substantially in real time and transmits a message at the alarm time entered in the event. The message is transmitted to the selected paging device. The paging device can also be the user's own paging device, wherein the user can remind him- or herself of important events. However, a disadvantage of this system is e.g. the fact that the recipient of the message must carry along the exactly correct paging device to be reached. On the other hand, the recipient may have several devices suitable for receiving this kind of messages, such as mobile stations and paging devices, wherein the sender of the message may not necessarily know which one of these devices the message should be addressed to in order to catch the recipient in time.

In telephone exchanges, the call transmission function is known, i.e. it is possible to transmit calls incoming to a certain telephone to another telephone selected in advance. The call transmission is set by entering the transmission command from the phone to which the incoming calls are intended to be transferred. In connection with the transmission command, the number of the telephone to which are transferred, is entered. The telephone can be a phone of an ordinary landline telecommunication network or also a mobile station connected with a mobile communication network. If the calls coming in a mobile station are directed to be transferred to another telecommunication terminal, also the messages coming in this mobile station are transferred to the selected telecommunication terminal. However, call transmission is not a useful function e.g. in situations in which one wishes to transfer the calls and messages coming in a certain telecommunication terminal to different telecommunication terminals, or to transfer only incoming messages. In systems of currently known technology, this requires that the sender of the message has, at the moment of transmission, knowledge of the number of the mobile station used by the recipient for receiving messages at that time. Consequently, the sender must select the number.

OBJECT OF THE INVENTION

One purpose of the present invention is to provide an improved method and apparatus for the transmission of messages addressed to the primary mobile station of a recipient to the secondary mobile station of the recipient. The method of the invention is characterized in what will be presented in the characterizing part of the appended claim 1. The system of the invention is characterized in what will be presented in the characterizing part of the appended claim 6. The invention is based on the idea that the secondary mobile station of the recipient can be activated to receive the messages related to calendar events and transmitted to the primary mobile station, wherein the messages are directed to the active mobile station of the recipient while maintaining the possibility to receive other calls with the primary receiver.

SUMMARY OF THE INVENTION

The invention can be applied particularly in data communication systems which have a possibility to transmit short messages to a terminal belonging to the data communication system on the basis of the identification of the terminal, such as a telephone number. Many mobile communication systems have this option. The present invention can be advantageously applied in mobile communication networks which provide a short message service (SMS) or paging.

The present invention gives significant advantages to the method and systems of prior art. The user does not always need to carry along his or her primary mobile station but he or she can, when necessary, take along a possibly smaller and lighter mobile station in situations when he or she will not need all the properties of the primary mobile station. The user may also have several mobile stations which can be simultaneously in use e.g. with different family members, and the user can still direct the important messages to him or her to the mobile station carried along, although this mobile station were not his or her primary mobile station. Thus it will also be possible to direct calls and messages to different mobile stations, if necessary. Furthermore, the user can, irrespective of the message transfer function, call the primary mobile station carried by another person. Other advantages of the invention will be presented in the appended dependent claims.

BRIEF DESCRIPTION OF THE DRAWINGS

In the following, the invention will be described in more detail with reference to the appended drawings, in which.

DETAILED DESCRIPTION OF THE PREFERRED EMBODIMENTS

Figure 1A:
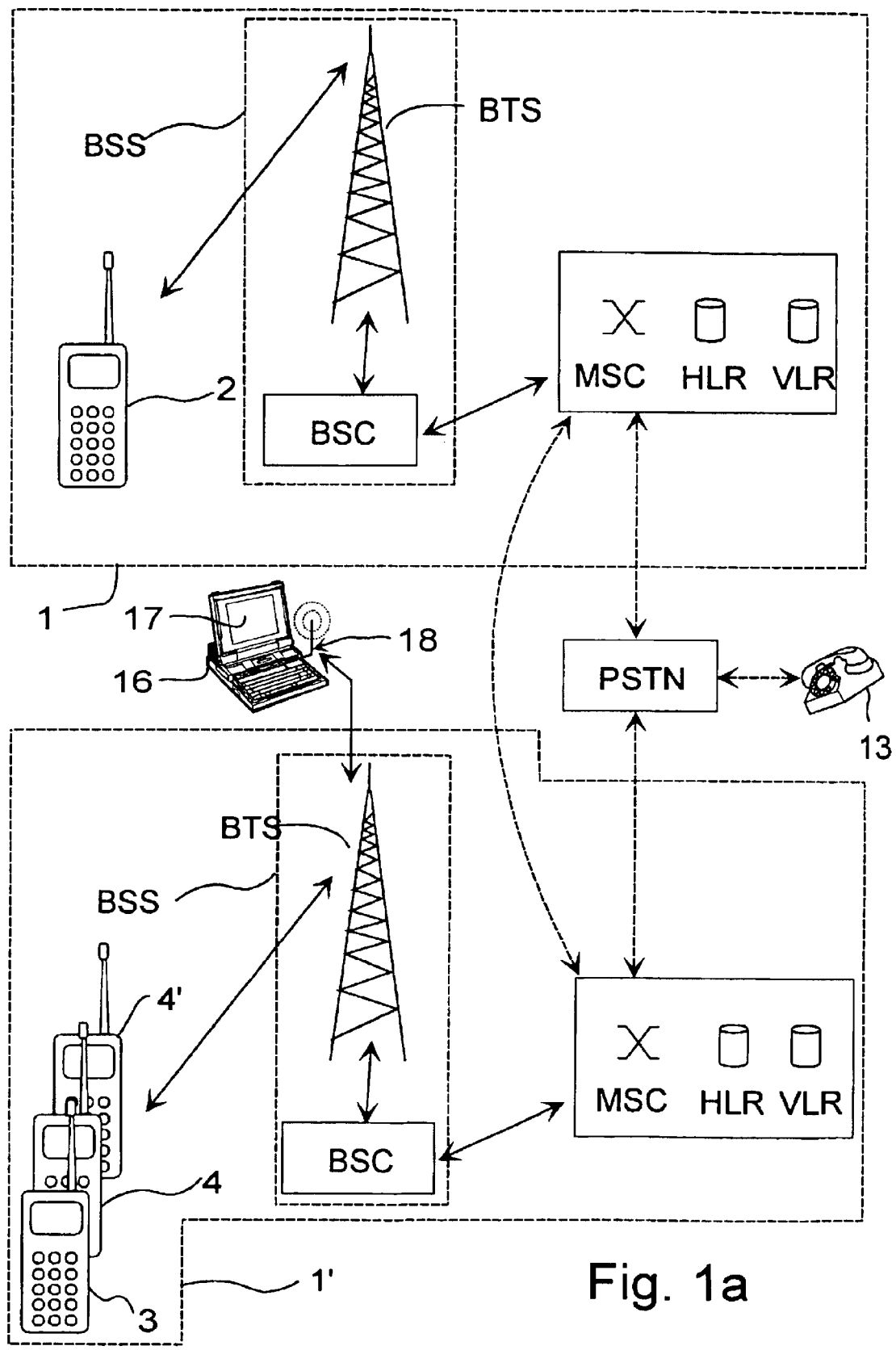
FIG. 1a shows the system according to an advantageous embodiment of the invention in a reduced skeleton diagram.

The invention will be described in the following by using the GSM mobile communication system as an example of the message transmission system. However, the invention will not be limited solely to this mobile communication system but the invention can be applied also in other mobile communication systems providing the possibility for transmitting addressed messages. The mobile communication system can be simplex or duplex.

As known, a GSM mobile communication network 1, 1' consists of mobile services switching centres MSC and of base station systems BSS, BSS'. A base station system consists of a base station BS and a base station controller BSC. Each base station system BSS, BSS' is controlled by one mobile services switching centre MSC. Mobile services switching centres MSC communicate with each other, wherein calls and other signalling can be transmitted within the mobile communication network 1, 1' as well as between the mobile communication network 1, 1' and a landline telecommunication network PSTN or another mobile communication network 1, 1'. In the same geographical area, there can also be several mobile communication networks 1, 1', usually provided by different teleoperators, even mobile communication networks complying to the same standard.

For example in Finland, there are presently two GSM mobile communication networks, one provided by Radiolinja and the other provided by Tele. The mobile services switching centre MSC has a home location register HLR and a visitor location register VLR. The home location register HLR is a database of the mobile communication network containing the basic data of the mobile station subscribers registered in the network. The home location register HLR contains e.g. the international mobile subscriber identity IMSI, the mobile subscriber international ISDN number MSISDN, as well as data related to the services available to the subscriber. The visitor location register VLR is a database of the mobile communication network containing the data required of the mobile subscribers within the area of the mobile communication network at each time for the transmission of calls. The visitor location register VLR is used e.g. for the control of the mobility of the mobile station, wherein calls and messages can be directed to the correct mobile station 2, 3, 4, 4' also in a situation where the mobile station is in the area of a different mobile communication network than in which the mobile station is registered. This situation comes also for example when the mobile station is used abroad.

With GSM mobile stations, each mobile subscriber must have at least one subscriber identity module (SIM) card. This SIM card contains the identification data of the mobile subscriber, such as the code and telephone number of the mobile subscriber. Thus by using these identification data, the messages and calls can be directed to the correct mobile station 3, 4, 4'. The SIM card can also be moved to another mobile station, if necessary, wherein also the calls are transmitted to this other mobile station.

The use of a SIM card requires usually that a PIN code is entered at the stage when the mobile station is turned on. This PIN code can be changed by the mobile subscriber, and the code is intended for preventing misuse of the SIM card for example if the SIM card is lost.

FIG. 1a is a reduced skeleton diagram showing the system for the transmission of messages according to a first advantageous embodiment of the invention. The message transmission system comprises e.g. a mobile communication network 1, which is this case is the GSM mobile communication network, the mobile station 2 of the sender, the primary mobile station 3 of at least one recipient, as well as one or several secondary mobile stations 4, 4' of said at least one recipient.

The recipient may also have a data computing device 16 such as a PC, laptop etc. The data computing device 16 can include a calendar application which can be used to generate calendar events. The data computing device 16 can also include an email application to be used to send and receive emails. The calendar event and received emails can be informed to the recipient prefarably by the display device 17, and/or by the audio means (not shown). The data computing device 16 can be connected to the landline telecommunication network PSTN by a modem (not shown), to an integrated services digital network (ISDN, not shown) by an ISDN adapter (not shown), or to the mobile communication network 1, 1' for example by a radio card 18.

Figure 1B:
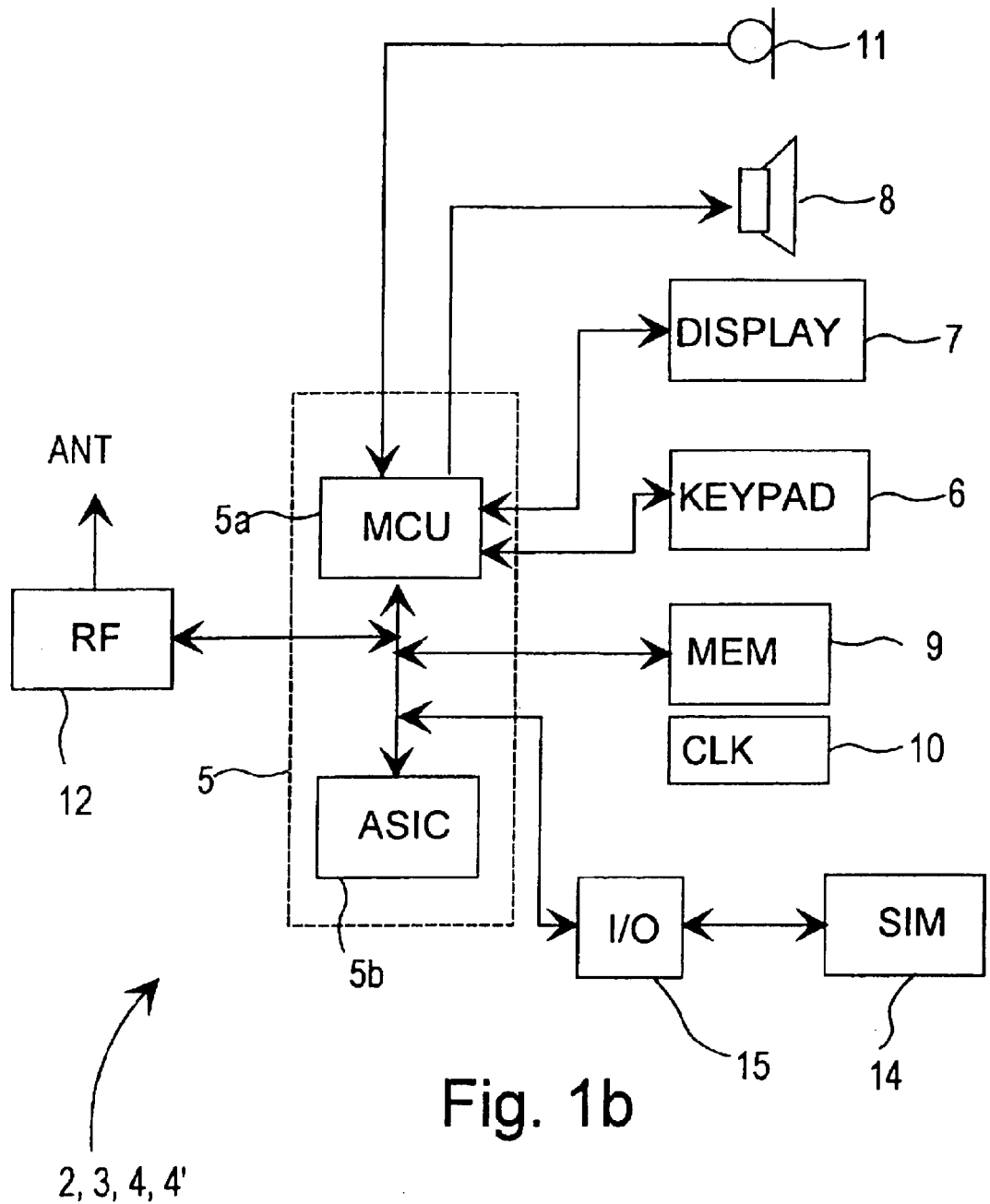
FIG. 1b is a reduced block diagram of a mobile station that can be used in the system according to an advantageous embodiment of the invention.

FIG. 1b is a reduced block diagram showing a mobile station 2, 3, 4 available in a system according to an advantageous embodiment of the invention, as an example. The block diagram shows primarily the blocks which are important for the description of this invention. It is obvious that the mobile station 2 of the sender, the primary mobile station 3 of the recipient, and the secondary mobile station 4, 4' of the recipient do not need to be similar to each other. The control unit 5 comprises e.g. a microcontroller unit 5a (MCU) and an application specific integrated circuit 5b (ASIC). Further, the mobile station 2 comprises a keypad 6, a display 7, an earphone 8, a microphone 11, memory means 9 which contains e.g. a non-volatile read-only memory for the storage of programs and a random access memory for storing data during the operation of the mobile station 2, 3, 4, 4'. Moreover, the mobile station comprises a real-time clock 10 which can be a separate micro circuit applicable for this purpose, or it can also be implemented with a program, wherein the mobile station 2, 3, 4, 4' receives information of real time e.g. from the mobile communication network 1. The mobile station 2, 3, 4, 4' comprises further a radio element 12 equipped with means for setting up a connection and for transmitting data between the mobile station and the mobile communication network. FIG. 1b shows also a SIM card 14 as well as means 15 for connecting the SIM card to the mobile station 2, 3, 4, 4'.

Figure 2:
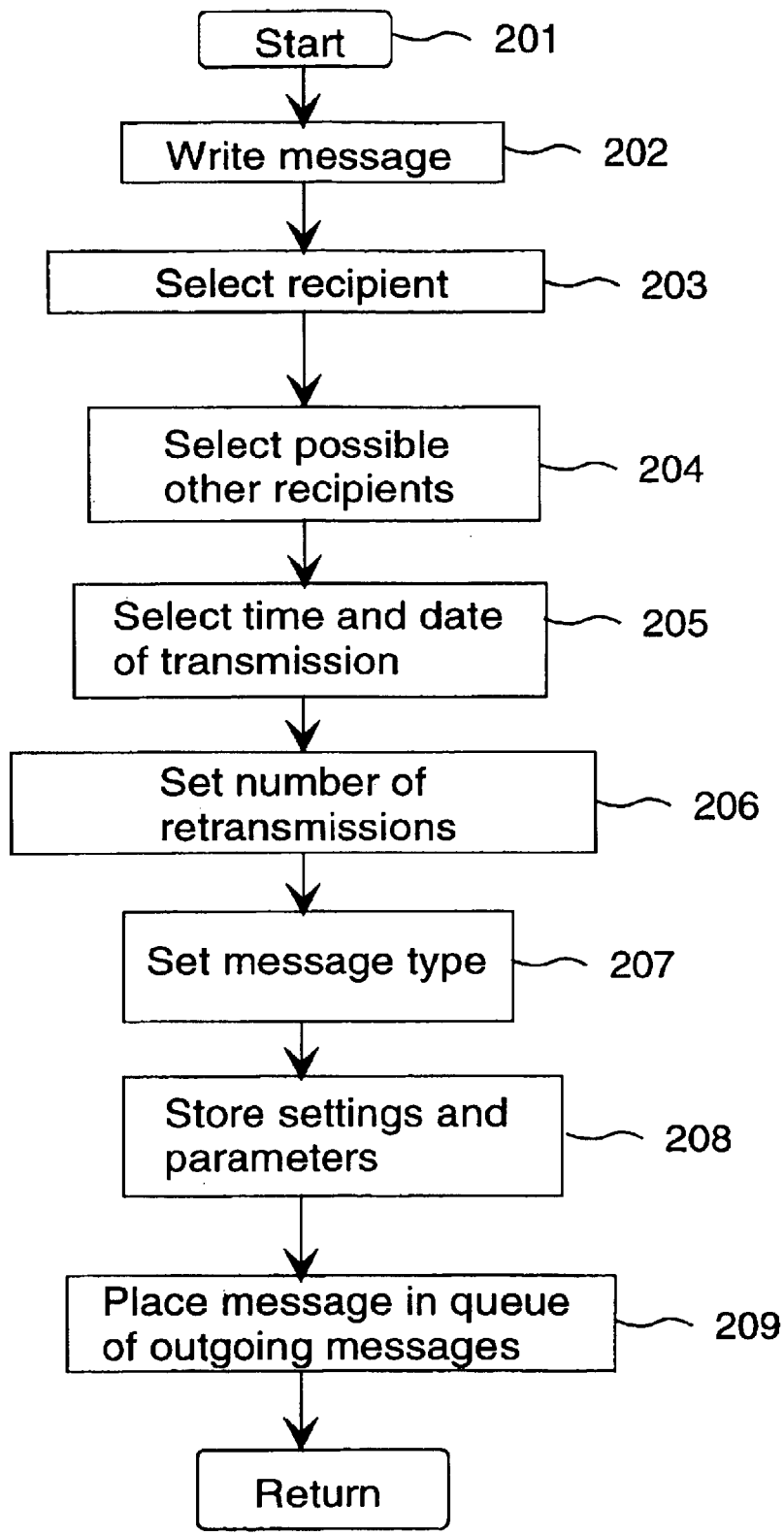
FIG. 2 is a flow chart showing the set-up of a message based on a calendar event.

FIG. 2 is a reduced block diagram showing the stages of setting up and storing a message in a system according to the first advantageous embodiment of the invention. The message is set up e.g. with a calendar application (201) which is installed in the mobile station 2, data processor or a corresponding message set-up device of the sender. The calendar application is an application program arranged to be run e.g. in the control unit 5 of the mobile station, as is known.

The sender can write the message to be transmitted by using the keypad 6. The control unit 5 recognizes the entries through the buttons and stores the message to be written in a message buffer or the like, from which the message can later be retrieved for processing. This is prior art to an expert in the field, and can be implemented by several different methods, wherein its description in more detail will not be necessary in this context. Having written the message (block 202), e g. "Meeting", the sender selects the identification data, advantageously the telephone number, of the primary mobile station 3 of at least one recipient of the message (block 203). When necessary, it is possible to select also several recipients (block 204), wherein the identification data of the primary mobile station 3 of each selected recipient is defined.

Next, the sender uses the keypad 6 for entering the date and time for the transmission of the message in the calendar application (block 205). The default value for the date of transmission is advantageously the same date, wherein it will not be necessary to enter the date of transmission separately but the time will be sufficient in the message to be sent on the date of writing the message. Further, the number of retransmission times can be determined for the message (block 206), i.e. how many attempts will be made to resend the message after a failed transmission. This will be presented below in this description, in connection with the description of the flow chart of FIG. 3.

Further, the type of the message is defined (block 207); this is advantageously a short message, but it can also be facsimile, electronic mail, audio call, data call, or another message type known as such. The type of the message indicates in which form the message will be transmitted to the recipient/recipients. In this description, primarily the transmission of a short message will be described in more detail, but the corresponding principles can be applied also to the other above-mentioned message types in which the message can be addressed to the correct recipient on the basis of identification data, advantageously a teleterminal number (telephone number).

After the sender has entered all the data required for the setting of the message in the calendar application, the message and its settings are stored (block 208). The storing is conducted preferably in the memory means 9 of the telecommunication terminal of the sender. After the storing, the message is waiting for the time of transmission set for the message (block 209).

If necessary, the recipient can activate his or her secondary mobile station 4, 4', which can also be a GSM mobile station, as the receiver of messages transmitted to the primary mobile station 3. The user has thus at least two SIM cards 14 or the like, wherein one SIM card 14 is installed in at least one secondary mobile station 4. Also the primary mobile station 3 and possible other secondary mobile stations 4, 4' can have a SIM card 14 installed in them. However, the recipient can have only one mobile station 3, 4, 4' at a time activated as the receiver of messages transmitted to the primary mobile station 3 of the recipient in question. Nevertheless, this activation does not prevent from receiving messages also with the other mobile stations 3, 4, 4', if the sender of the messages has given the telephone number of this mobile station 3, 4, 4' as the address.

Next, the transmission of the message will be described, as presented in a flow chart in FIG. 3.

The mobile station 2 of the sender, e.g. a calendar application program (block 301), examines the settings of messages to be transmitted according to the entries in the calendar substantially in real time. The application program compares time information from a real time clock 10 with the transmission time information of each message in a manner known as such (block 302). When the comparison shows that a pre-set transmission time is equal to the time indicated by the real time clock, the settings of the message in question are retrieved from the memory means 9 (block 303). On the basis of the identification data of the receiver defined in the message, a query message is set up in a mobile communication network 1 in order to obtain network information on the primary mobile station 3 of the said recipient, such as the telephone number and the operational state (block 304). On the basis of the operational state, it can be deduced (block 305) whether the mobile station 3 in question is activated for the reception of messages at the time.

If the operational state data indicates that the primary mobile station 3 of the recipient is activated as a mobile station receiving messages, the telephone number of this primary mobile station 3 is set as the address of the message to be transmitted, and the message is transmitted (block 306).

If the operational state data indicates that the primary mobile station 3 of the recipient is not activated as a mobile station receiving messages at the time, the mobile communication network 1 is queried whether the recipient has possibly other, secondary mobile stations 4, 4' available (block 307). The reply from the mobile communication network 1 is examined in block 308. If a secondary mobile station 4, 4' of the recipient is found in the mobile communication network 1 to be examined, it is further examined whether this one is activated to receive messages. If it is, the telephone number of this secondary mobile station 4, 4', given in the reply message from the mobile communication network 1, is set in block 309 as the address for the message to be transmitted. After this, the operation goes on again from block 306.

If this secondary mobile station 4, 4' is not activated to receive messages, it is examined in block 310 whether the recipient has still another secondary mobile station 4, 4' suitable for receiving messages. If no other mobile stations of the recipient are found, it is possible to try to make a search also in another mobile communication network 1'. If there are no other mobile stations, the identification data of the primary mobile station 3 is used as the address of the message (block 311), and the operation goes on from block 306 by transmission of the message.

If the network information contains data of another secondary mobile station 4, 4' of the user, the operation goes on in block 307, in which a new query message is generated to be transmitted to the mobile communication network 1, 1' to find out the network information of this secondary mobile station 4, 4'.

Figure 4:
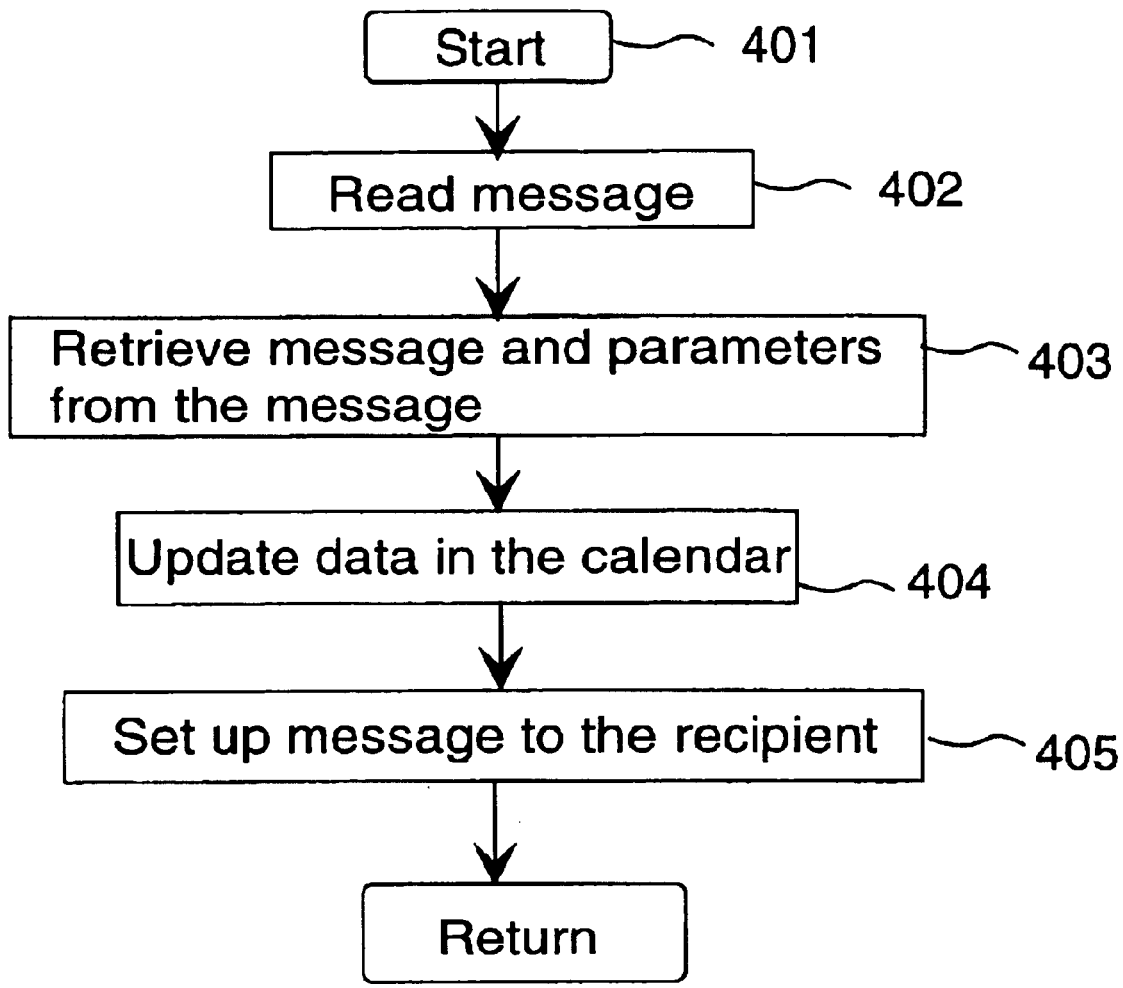
FIG. 4 is a flow chart showing the reception of a message based on a calendar event.

We shall still describe how the message is received in the mobile station of the recipient and how the recipient will be informed. This is presented in a flow chart in FIG. 4. The activated secondary mobile station of the recipient runs a message processing application program 401 which is implemented preferably in the application software of the control unit 5. The message is received e.g. in a message buffer (not shown) which is implemented preferably in the random-access memory of in the memory means 9 (block 402). The date and time of the event to be communicated, as well as the subject of the event (e.g. "Meeting") and possibly agenda, names of participants etc. are examined from the message (block 403). On the basis of the date and time, the corresponding data of the event can be entered in the calendar application in the mobile station of the recipient (block 404). The received message is formed into a message, e.g. a text message or an icon on the display 7 of the mobile station and/or an audio message in the ear piece 8 of the mobile station (block 405).

Figure 3:
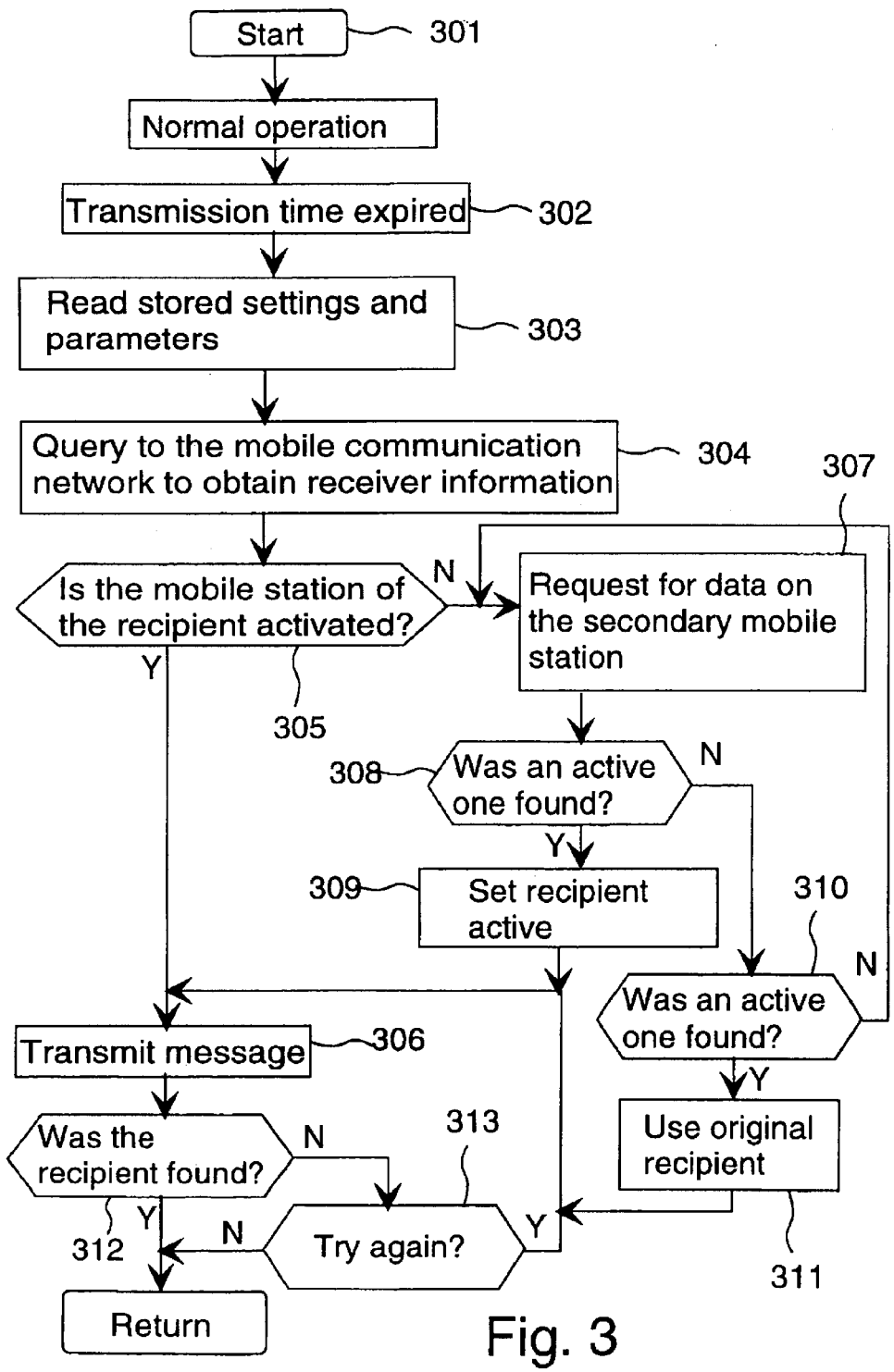
FIG. 3 is a flow chart showing the transmission of a message based on a calendar event.

It is often important for the sender to be informed whether the message has come through (block 312 in FIG. 3). This can be arranged in a mobile station system e.g. in a way that the short message service centre SM-SC sends an acknowledgement message to the mobile station of the sender after the message has been transmitted to the mobile station 3, 4, 4' of the recipient. The acknowledgement message can be transmitted e.g. via a signalling channel. How this is carried out in practice, depends e.g. on the structure of the mobile communication network to be used at a time and is prior art to an expert in the field. If the message cannot be transmitted to the mobile station 3, 4, 4' of the recipient, it is possible to try to send the message again if retransmission has been set into use (block 313).

In the following, a method according to an advantageous embodiment of the invention for activating a secondary mobile station 4, 4' for receiving messages addressed to a primary mobile station 3 with the secondary mobile station 4, 4' will be described in a system shown in FIG. 1. Activation is conducted e.g. with the menu functions of the secondary mobile station 4, 4', or with a certain button function, for example by pressing the "*" button three times and possibly entering also a password to prevent unauthorized activation attempts for example in case of loss of the mobile station. The way of conducting the activation function is not essential for the application of this invention but it can vary in different applications and even in different mobile stations. After entering the activation command, information on this is transmitted to the mobile communication network 1, 1' in which the mobile subscriber's SIM card 14 installed in the mobile station in question is registered. In the mobile communication network 1, 1', the activation information is stored for example in the database of the mobile services switching centre, in the information on the primary mobile station 3 of the subscriber in question, such as in the home location register HLR. Further, said mobile communication network 1, 1' can transmit the activation data to other mobile communication networks in which said mobile subscriber has SIM cards registered. Thus all the home location registers of the subscriber are aware of which mobile station of the subscriber is active at the time.

The mobile subscriber can also store all the identification data of his or her SIM cards (mobile station telephone numbers) in the memory means 9 of his or her mobile stations, wherein the activation takes place e.g. in the following way. The mobile station to be activated sends an activation message informing the identification data of the mobile station to be activated, to the mobile communication network 1, 1' of the teleoperator corresponding to the SIM card in question. Next, the mobile station reads from the storing means 9 the identification data of the other SIM cards of the mobile subscriber and transmits the activation data to the mobile communication networks 1, 1' of teleoperators corresponding to the other SIM cards respectively, wherein also these mobile communication networks 1, 1' have information on the mobile station active at the time.

Activation can also be automatic in situations in which the mobile subscriber has no other mobile stations switched on at the time. Thus all the messages transmitted to the primary mobile station 3 of the said subscriber can be addressed to this mobile station switched on. This automatic activation can be implemented advantageously in the mobile communication network 1, 1', wherein the mobile communication network examines e.g. in the home location register HLR whether the subscriber has other mobile stations switched on. If the subscriber in question has no other mobile stations switched on at the time, the mobile communication network activates this mobile station.

In the following, an advantageous example will be given on the structure of an activation message. The message is based on the separator ciphers * and # commonly used in digital telecommunication networks. The message has the form *#[code]#[user identification]#[A subscriber identification]#[operator identification]#[password]#, in which [code] indicates a preferably numerical activation code, e.g. 123; [user identification] indicates a code identifying the mobile subscriber, e.g. 0987654321; [A subscriber identification] indicates the telephone number to be activated, e.g. +358505678901; [operator identification] is the identification of the teleoperator providing the mobile communication network to which the message will be transmitted, e.g. 8353; and [password] is a password defined by the user, e.g. 5432. The A subscriber identification can be read e.g. from the SIM card 14, or the mobile subscriber can enter it in the message by him- or herself. Thus, the example message is:
*#123#0987654321#+358505678901#8353#5432#.

In a corresponding way, an example is given of a query message as presented in the flow chart of FIG. 3, which will be transmitted in block 306 to the mobile communication network 1, 1'. The example query has the form *#[query code]#, which is the code for a query, e.g. 124. Thus the example message is: *#124#.

In response, the mobile communication network 1, 1' transmits e.g. an active telephone number, for example +358055544332. This telephone number is not necessary displayed to the sender who made the query because some persons have secret telephone numbers which they do not want to make public. The sending mobile station 2 uses the telephone number thus received in the message to be transmitted, as presented above in this description.

The invention can be applied also in group transmissions for example in the following way: The sender of the message has entered in the calendar application of his or her own mobile station 2 the time of a meeting and a message which will be transmitted to the participants of the meeting advantageously some time before the beginning of the meeting. Thus in addition to the time of the message, the persons are defined to whom the message is to be delivered. The sender knows the telephone numbers of the primary mobile stations 3 of the persons to whom the message is addressed. The data are entered either directly with the keyboard or they can have been stored in advance e.g. in the so-called telephone directory memory of the mobile station 2 or the SIM card 14, as is known. The sender can also have made groups of persons, wherein a certain group is a collection of the telephone numbers of the persons belonging to this group. Such groups may include e.g. workers in a certain project. Thus the sender can select the group in question, wherein the primary mobile station 3 of each group is identified with the information of the group, this information being used at the stage of transmitting the message. At the time set for transmission of the message, the mobile station 2 of the sender generates one message to be transmitted to the mobile station 3 of each person belonging to the selected group and conducts transmission of each message, as presented above in connection with the description of the flow chart of FIG. 3.

Consequently, any person can have his or her secondary mobile station 4, 4' activated, wherein the message coming in the primary mobile station of this person is directed to this secondary mobile station 4, 4' according to a corresponding principle as presented above. In this way, the accessibility of the users is improved, and the sender does not need to have knowledge of all the possible mobile station identifications that each user can have available. Thus it is sufficient for the sender to define one identification, wherein the system according to the invention takes care of directing the message to the correct, active mobile station 3,4,4'.

In the following, further another advantageous embodiment of the present invention will be described. The user has defined a calendar event, for example an appointment or a meeting by using a calendar application of a data computing device 16 such as a PC, laptop, PDA, or communicating device such as a mobile station. The user has defined at least the alarm time and the message. The calendar application displays the message at the given time on the display of the device. Normally, if the user is near the device, he or she will read the message. However, if the user is not nearby at the alarm time, the alarm will not be acknowledged by the user. The calendar application begins to measure time which has elapsed from the alarm time. There is defined a delay, for example 30 s, after which the calendar application determines that the user is not nearby if the calendar event remains unacknowledged. Next, the calendar application begins to forward the calendar event to another device, for example to the primary mobile station 3 of the user. From now on, the method of this advantegous embodiment of the invention will proceed as described earlier in this application so that the calendar event will be forwarded to the activated mobile station 3, 4, 4' of the user.

The user can define a delay time that the calendar application waits for an acknowledgement before it begins to forward the calendar event. The delay time can be measured for example by using a timer (not shown) of the data computing means 16 or by an application program, which is known as such. This delay can also have a default value. Moreover, the user can define the primary mobile station 3 and one or more secondary mobile stations 4, 4'.

Furthermore, the invention can be applied in a way that after the message which is sent for example from the mobile station 2 of the sender is received at the user's data processor, PDA, mobile station, or the like, the device that received the message starts a time-out for monitoring if the user will read the message within a prescribed time. If the user does not read the message within the predetermined time, the device will forward the message further to the primary mobile station 3, as presented above in this description. By this method, the accessibility of a person can be improved further in various situations. The user does not need to set forwarded transmission of messages separately, but they are forwarded automatically if they are not read. Moreover, the user does not need to break up the forwarded transmission when returning to the vicinity of the data processor, because he/she has the time of the predetermined delay to read the message. Further, the user does not need to maintain calendar functions in several locations, but it is sufficient that the user has appointments and other events recorded in one location. Thus, the system according to an advantageous embodiment of the invention will take care of the transmission of messages to the location of the user at each time.

The invention can also be applied in a way that instead of the secondary mobile station 4, 4', the recipient directs the messages e.g. to a telecommunication terminal 13 of a landline telecommunication network PSTN. Thus the mobile station of the sender converts the text-form message to be transmitted e.g. to a speech message which is transmitted to the said telecommunication terminal 13. The message can also be converted to a dual tone multiple frequency (DTMF) signal which can be transmitted also through the landline telecommunication network PSTN to the landline telecommunication terminal 13 of the recipient. The message to be transmitted can also be a telecopy transmission, wherein the transmission is directed to a telecommunication terminal of the recipient that is suitable for the reception of telecopies and is active at the time.

Turning off of activation takes place e.g. in a situation that an activated mobile station is turned off. Thus the messages remain preferably waiting in the system, e.g. in the message service centre, until the user turns on this mobile station again or activates another mobile station available.

The invention is not limited solely to the examples presented above but it can be modified within the scope of the appended claims.

What is claimed is:

1. Method using a message service for the transmission of textual messages from a user, containing information from a sender, to the mobile station of a recipient, who has a primary mobile station capable of receiving at least voice calls and textual messages from the user, and at least one secondary mobile station having a unique calling number, capable of receiving at least textual messages from the user, comprising the step of directing textual messages from the user addressed to the primary mobile station to any of the secondary mobile stations of the recipient, irrespective of whether the primary mobile station is in use and whether notification messages indicating the receipt of textual messages from the user are used.

2. Method according to claim 1, wherein a secondary mobile station of the recipient is activated as the receiver of user messages to be transmitted to the primary mobile station so that user messages addressed to the primary mobile station are directed to the activated secondary mobile station.

3. Method according to claim 1, wherein the user messages are generated on the basis of the notification of calendar events.

4. Method according to claim 2, wherein the activation is conducted from the secondary mobile station to be activated.

5. Method according to claim 2, further comprising the steps of:
   using a data computing device of the recipient for producing a notification message informing of a received user message to the recipient and to acknowledge the received user message by the recipient, and
   first directing the received user message to the data computing device and, if the user message is not acknowledged by a determined time, forwarding the user message to the activated mobile station.

6. System for the transmission of textual messages from a user, containing information from a sender, to a recipient, who has a primary mobile station comprising at least means for receiving voice calls and means for receiving textual messages from the user, and at least one secondary mobile station having a unique calling number and comprising at least means for receiving textual messages from the user, wherein the improvement comprises:
   means for activating a secondary mobile station of the recipient to receive textual messages from the user addressed to the primary mobile station, and
   means for directing textual messages from the user addressed to the primary mobile station to the activated secondary mobile station irrespective of whether the primary mobile station is in use and whether notification messages indicating the receipt of textual messages from the user are used.

7. System according to claim 6, wherein the user messages are generated on the basis of the notification of calendar events.

8. System according to claim 6, further comprising:
   a data computing device, which comprises means for receiving a user message and means for producing a notification message informing of the receipt of a user message,
   means for first directing a user message to the data computing device,
   means for measuring time and producing an indication if the means for producing a notification message informing of the receipt of a user message does not produce the informing message by a determined time, and
   means, responsive to the production of said indication by said means for measuring time for forwarding the received user message to the activated mobile station of the recipient.

9. System according to claim 6, wherein the means for activating a secondary mobile station of the recipient as the receiver of user messages addressed to the primary mobile station comprises means for conducting the activation from the secondary mobile station to be activated.

10. Method using a message service for the transmission of textual messages from a user, containing information from a sender, to a recipient having a primary mobile station, capable of receiving at least voice calls and textual messages from the user, and at least one secondary mobile station having a unique calling number, capable of receiving at least textual messages from the user, comprising the steps of:
   transmitting textual messages from the user addressed to the primary mobile station; and
   activating at least one of said secondary mobile stations to receive said textual messages from the user addressed to the primary mobile station irrespective of whether the primary mobile station is in use and whether notification messages indicating the receipt of textual messages from the user are used.

11. Method according to claim 10, wherein said activated secondary mobile station of the recipient is activated as the receiver of user messages to be transmitted to the primary mobile station so that user messages addressed to the primary mobile station are directed to the activated secondary mobile station.

12. Method according to claim 11, wherein the activation is conducted from the secondary mobile station to be activated.

13. Method according to claim 11, further comprising the steps of:
using a data computing device of the recipient for producing a notification message informing the recipient of a received user message and to acknowledge the received user message by the recipient, and
first directing the received user message to the data computing device and, if the user message is not acknowledged by a determined time, forwarding the user message to the activated mobile station.

14. Method according to claim 10, wherein the user messages are generated on the basis of the notification of calendar events.

15. System for the transmission of textual messages from a user, containing information from a sender, to a recipient having a primary mobile station, comprising at least means for receiving voice calls and means for receiving textual messages from the user, and at least one secondary mobile station having a unique calling number, comprising at least means for receiving textual messages from the user, wherein the improvement comprises:
means for activating a secondary mobile station of the recipient to receive textual messages from the user addressed to the primary mobile station, and
means for directing textual messages from the user addressed to the primary mobile station to the activated secondary mobile station irrespective of whether the primary mobile station is in use and whether notification messages indicating the receipt of textual messages from the user are used.

16. System according to claim 15, wherein the user messages are generated on the basis of the notification of calendar events.

17. System according to claim 15, further comprising:
a data computing device having means for receiving a user message and acknowledging means for producing an acknowledgment of the receipt of a user message,
means for first directing a user message to the data computing device,
means for measuring time and producing an indication if the acknowledging means does not produce an acknowledgement of the receipt of a user message by a determined time, and
means, responsive to the production of said indication by said means for measuring time, for forwarding the received user message to the activated secondary mobile station of the recipient.

18. System according to claim 15, wherein the means for activating a secondary mobile station of the recipient as the receiver of user messages addressed to the primary mobile, station comprises means for conducting the activation from the secondary mobile station to be activated.

19. Method using a message service for the transmission of textual messages from a user, containing information from a sender, to the mobile station of a recipient, who has a primary mobile station capable of receiving at least voice calls and textual messages from the user, and at least one secondary mobile station associated with a unique calling number, capable of receiving at least textual messages from the user, comprising the step of directing textual messages from the user addressed to the primary mobile station to any of the secondary mobile stations of the recipient, irrespective of whether the primary mobile station is in use and whether notification messages indicating the receipt of textual messages from the user are used.

20. Method according to claim 19, wherein a secondary mobile station of the recipient is activated as the receiver of user messages to be transmitted to the primary mobile station so that user messages addressed to the primary mobile station are directed to the activated secondary mobile station.

21. Method according to claim 19, wherein the user messages are generated on the basis of the notification of calendar events.

22. Method according to claim 20, wherein the activation is conducted from the secondary mobile station to be activated.

23. Method according to claim 20, further comprising the steps of:
using a data computing device of the recipient for producing a notification message informing of a received user message to the recipient and to acknowledge the received user message by the recipient, and
first directing the received user message to the data computing device and, if the user message is not acknowledged by a determined time, forwarding the user message to the activated mobile station.

24. System for the transmission of textual messages from a user, containing information from a sender, to a recipient, who has a primary mobile station comprising at least means for receiving voice calls and means for receiving textual messages from the user, and at least one secondary mobile station associated with a unique calling number and comprising at least means for receiving textual messages from the user, wherein the improvement comprises:
means for activating a secondary mobile station of the recipient to receive textual messages from the user addressed to the primary mobile station, and
means for directing textual messages from the user addressed to the primary mobile station to the activated secondary mobile station irrespective of whether the primary mobile station is in use and whether notification messages indicating the receipt of textual messages from the user are used.

25. System according to claim 24, wherein the user messages are generated on the basis of the notification of calendar events.

26. System according to claim 24, further comprising:
a data computing device, which comprises means for receiving a user message and means for producing a notification message informing of the receipt of a user message,
means for first directing a user message to the data computing device,
means for measuring time and producing an indication if the means for producing a notification message informing of the receipt of a user message does not produce the informing message by a determined time, and
means, responsive to the production of said indication by said means for measuring time for forwarding the received user message to the activated mobile station of the recipient.

27. System according to claim 24, wherein the means for activating a secondary mobile station of the recipient as the receiver of user messages addressed to the primary mobile station comprises means for conducting the activation from the secondary mobile station to be activated.

28. Method using a message service for the transmission of textual messages from a user, containing information from a sender, to a recipient having a primary mobile station, capable of receiving at least voice calls and textual messages from the user, and at least one secondary mobile station associated with a unique calling number, capable of receiving at least textual messages from the user, comprising the steps of:

transmitting textual messages from the user addressed to the primary mobile station; and activating at least one of said secondary mobile stations to receive said textual messages from the user addressed to the primary mobile station irrespective of whether the primary mobile station is in use and whether notification messages indicating the receipt of textual messages from the user are used.

29. Method according to claim 28, wherein said activated secondary mobile station of the recipient is activated as the receiver of user messages to be transmitted to the primary mobile station so that user messages addressed to the primary mobile station are directed to the activated secondary mobile station.

30. Method according to claim 29, wherein the activation is conducted from the secondary mobile station to be activated.

31. Method according to claim 29, further comprising the steps of:

using a data computing device of the recipient for producing a notification message informing the recipient of a received user message and to acknowledge the received user message by the recipient, and first directing the received user message to the data computing device and, if the user message is not acknowledged by a determined time, forwarding the user message to the activated mobile station.

32. Method according to claim 28, wherein the user messages are generated on the basis of the notification of calendar events.

33. System for the transmission of textual messages from a user, containing information from a sender, to a recipient having a primary mobile station, comprising at least means for receiving voice calls and means for receiving textual messages from the user, and at least one secondary mobile station associated with a unique calling number, comprising at least means for receiving textual messages from the user, wherein the improvement comprises:

means for activating a secondary mobile station of the recipient to receive textual messages from the user addressed to the primary mobile station, and means for directing textual messages from the user addressed to the primary mobile station to the activated secondary mobile station irrespective of whether the primary mobile station is in use and whether notification messages indicating the receipt of textual messages from the user are used.

34. System according to claim 33, wherein the user messages are generated on the basis of the notification of calendar events.

35. System according to claim 33, further comprising:

a data computing device having means for receiving a user message and acknowledging means for producing an acknowledgment of the receipt of a user message, means for first directing a user message to the data computing device, means for measuring time and producing an indication if the acknowledging means does not produce an acknowledgement of the receipt of a user message by a determined time, and means, responsive to the production of said indication by said means for measuring time, for forwarding the received user message to the activated secondary mobile station of the recipient.

36. System according to claim 33, wherein the means for activating a secondary mobile station of the recipient as the receiver of user messages addressed to the primary mobile station comprises means for conducting the activation from the secondary mobile station to be activated.

* * * * *